(12) United States Patent
Howes

(10) Patent No.: US 8,860,330 B1
(45) Date of Patent: Oct. 14, 2014

(54) PROGRAMMABLE CURRENT SOURCE WITH OPTIMIZED COMPLIANCE REGION FOR EFFICIENT BACKLIGHTING IN PORTABLE APPLICATIONS

(71) Applicant: Dialog Semiconductor GmbH, Kirchheim/Teck-Nabern (DE)

(72) Inventor: Rupert Howes, Stroud (GB)

(73) Assignee: Dialog Semiconductor GmbH, Kirchheim/Teck-Nabern (DE)

( * ) Notice: Subject to any disclaimer, the term of this patent is extended or adjusted under 35 U.S.C. 154(b) by 0 days.

(21) Appl. No.: 13/859,939

(22) Filed: Apr. 10, 2013

(30) Foreign Application Priority Data

Apr. 8, 2013  (EP) ...................................... 13368013

(51) Int. Cl.
  *H05B 37/02* (2006.01)
  *H02M 3/156* (2006.01)
(52) U.S. Cl.
  CPC ............... *H02M 3/156* (2013.01); *H05B 37/02* (2013.01)
  USPC ............................. 315/297; 315/307; 315/312
(58) Field of Classification Search
  USPC ........................... 315/294, 307–309, 297, 312
  See application file for complete search history.

(56) References Cited

U.S. PATENT DOCUMENTS

| | | | |
|---|---|---|---|
| 6,930,737 B2 | 8/2005 | Weindorf et al. | |
| 7,205,818 B2 | 4/2007 | Hopsecger | |
| 7,425,909 B2 | 9/2008 | Rose et al. | |
| 7,646,235 B2 | 1/2010 | Christ | |
| 7,948,455 B2* | 5/2011 | Han et al. ......................... | 345/82 |
| 8,116,878 B1 | 2/2012 | Palmer | |
| 8,175,719 B2 | 5/2012 | Shi et al. | |
| 2009/0174338 A1 | 7/2009 | Muramatsu | |
| 2011/0062895 A1* | 3/2011 | Ji .................................. | 315/309 |
| 2014/0124656 A1* | 5/2014 | Lan et al. ................... | 250/208.2 |

FOREIGN PATENT DOCUMENTS

EP    2 012 560    1/2009

OTHER PUBLICATIONS

"New Design and Application of High Efficiency LED Driving System for RGB-LED Backlight in LCD Display," by Sang-Yun Lee et al., Power Electronics Specialists Conference, 2006, PESC' 06. 37th IEEE, Jun. 2006, 5 pgs.
European Search Report 13368013.2-1802 Mailed:Sep.17, 2013, Dialog Semiconductor GmbH.

* cited by examiner

*Primary Examiner* — Don Le
(74) *Attorney, Agent, or Firm* — Saile Ackerman LLC; Stephen B. Ackerman

(57) ABSTRACT

A programmable current source programmable current source circuit has DAC current source providing an incrementally programmable current levels. A programmable reference current source adjusts a compliance factor of the DAC current source. An input adjustment code indicating an output current amplitude is adjusted by a adjustment code modification circuit when the output current is less than the activation compliance level and generates a signal to set the reference current to a lower level to adjust the compliance factor of the DAC current source to a lower level to decrease power dissipation in the programmable current source at lower current levels.

16 Claims, 5 Drawing Sheets

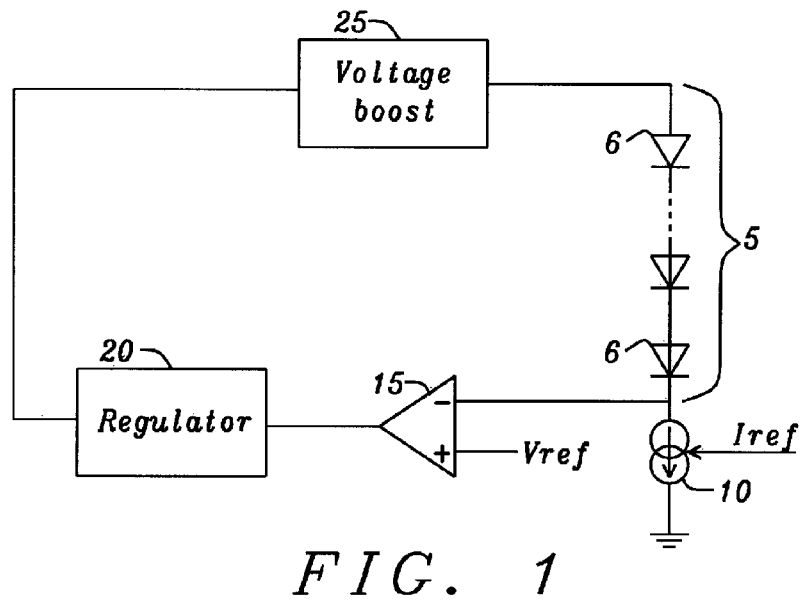
FIG. 1
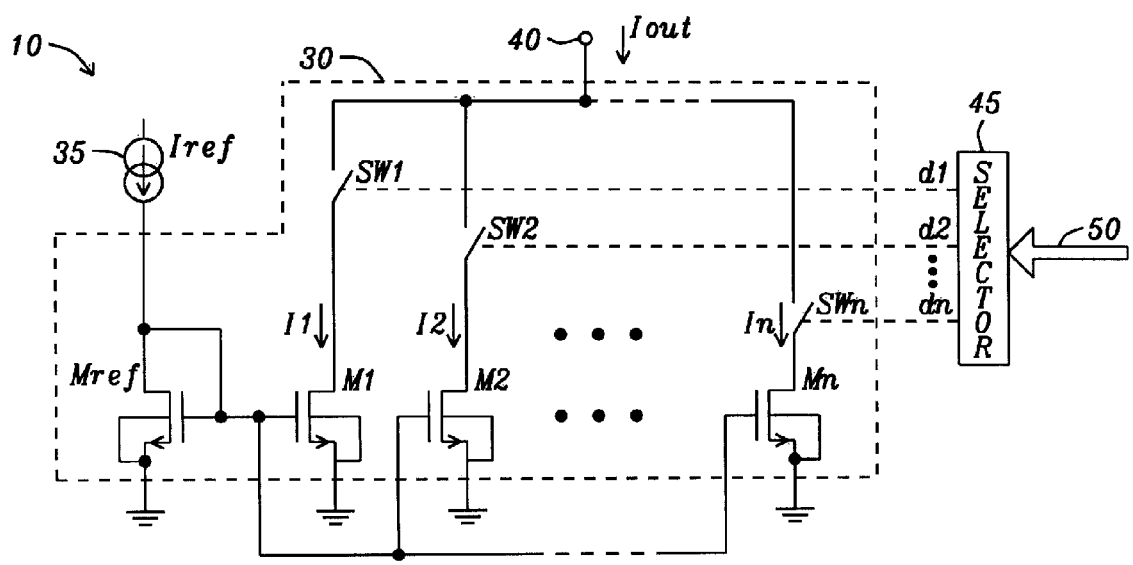
FIG. 2 - Prior Art

PROGRAMMABLE CURRENT SOURCE WITH OPTIMIZED COMPLIANCE REGION FOR EFFICIENT BACKLIGHTING IN PORTABLE APPLICATIONS

TECHNICAL FIELD

This disclosure relates generally to electronic circuits. More particularly, this disclosure relates to electronic current source circuits. Even more particularly, this disclosure relates to programmable current source circuits having adjustable compliance.

BACKGROUND

Mobile telephones with advanced computing capability, personal digital assistants (PDA), portable laptop and tablet computers are examples of battery-powered equipment that demand long battery life and therefore require highly power efficient circuits. The vast majority of these use liquid crystal displays (LCD) as a visual interface. LCD's do not produce light themselves and thus require illumination (reflective or transmissive) to be visible. The vast majority of LCD's are presently backlighted to provide the necessary illumination. LCD displays are commonly backlit with light emitting diodes (LED). In order to provide the light intensity required for the LCD's to be visible in bright interior or sunlit exterior environment, the LED's used for backlighting can consume a significant amount of power.

FIG. 1 is a schematic diagram of an LCD display backlighting circuit. In this implementation of a backlighting circuit, the multiple white LED's 5 are serially connected to a programmed current source 10 at the cathode of the last LED of the serially connected LED's 5. The reference current Iref is used to establish the current level of the current source. Given number of LED's 5 needed to provide the backlighting for even smaller displays, the number of LED's in a serially connected string 5 is sufficient such that the voltage across the string of serially connected LED's 5 requires a voltage boost converter circuit 25 to insure that the current through the serially connected LED's 5 is sufficient to provide the necessary illumination. The output of the voltage boost converter 25 is connected to the anode of the top LED 8 of the serially connected LED's 5. The control of the voltage boost circuit 25 is provided by the operational amplifier 15 and the regulator 20. The reference voltage Vref provides the control voltage to insure that the voltage developed across the programmed current source 10 is approximately that of the reference voltage Vref.

The efficiency of the backlighting circuit depends on several factors, one of which is the power dissipated in the programmed current source 10, which itself is a function of the voltage across the programmed current source 10. The brightness of the display is a function of the current through the serially connected LED string 5. Since the brightness needs to be controlled over a wide operating range, so the DAC current source 10 must be programmable over a wide range also.

FIG. 2 is schematic of the programmed current source 10 of FIG. 1. The reference current, Iref, generated by the reference current source 35 is an input to the digital-to-analog conversion (DAC) current source 30. The reference current Iref develops a reference gate-to-source voltage for the diode connected N-type metal oxide semiconductor (NMOS) transistor Mref. The reference current Iref is then mirrored as an output current developed through the saturated current source NMOS transistors M1, . . . , Mn. The saturated current source NMOS transistors M1, . . . , Mn are selectively connected to the output to the output node 40 through the switches SW1, . . . , SWn. The output current Iout is determined by a number of switches SW1, . . . , SWn that are activated where the output current Iout is the sum of the stage output currents I1, . . . , In developed through the selected current source NMOS transistors M1, . . . , Mn.

The switches SW1, . . . , SWn are small overdriven NMOS transistors with a small drain-to-source voltage level. The selector 45 provides the select signals d1, . . . , dn to the corresponding switches SW1, . . . , SWn. The voltage level of the select signals d1, . . . , dn are sufficiently large to drive the NMOS transistors into the triode region to have the small drain-to-source voltage level. In most implementations, the desired amount of current is transferred to the selector 45 as a digital input code 50. Based on the digital input code 50, the magnitude of the output current Iout is determined as, what is commonly called in the art, a thermometer code where each of the select signals d1, . . . , dn are activated sequentially from the first select signal a1 to the last select signal dn. Activating each switch SW1, . . . , SWn in turn increases the output current Iout by the current level of the additional selected current source NMOS transistors M1, . . . , Mn added such that the minimum output current is equal to the stage output current I1 and the maximum output current is equal to the sum of the stage output currents I1, . . . , In.

As is known in the art, the reference current Iref of the diode-connected NMOS transistor Mref is given by the equation:

$$Iref = \frac{\mu c_{ox}}{2}\left(\frac{W}{L}\right)_{Mref}(V_{gsMref} \pm V_T)^2$$

Where:
μ is the mobility of the channel of the NMOS transistor Mref.
$C_{ox}$ is the oxide capacitance of the NMOS transistor Mref.
$(W/L)_{Mref}$ is the gate width to length ratio of the NMOS transistor Mref.
$V_{gsMref}$ is the gate-to-source voltage of the NMOS transistor Mref.
$V_T$ is the threshold voltage of the NMOS transistor Mref.

Similarly, the mirrored stage output currents I1, . . . , In of the each of the current source NMOS transistors M1, . . . , Mn is given by the equation:

$$Ix = \frac{\mu c_{ox}}{2}\left(\frac{W}{L}\right)_{Mx}(V_{gsMx} \pm V_{TMx})^2$$

Where:
x is an indicator for the mirrored stage output currents I1, . . . , In and the current source NMOS transistors M1, . . . , Mn.
μ is the mobility of the channel of the NMOS transistor Mn.
$C_{ox}$ is the oxide capacitance of the NMOS transistor Mn.

$$\left(\frac{W}{L}\right)_{Mx}$$

is the gate width to length ratio of the NMOS transistor Mx.
$V_{gsMx}$ is the gate-to-source voltage of the NMOS transistor Mx.

$V_{TMx}$ is the threshold voltage of the NMOS transistor Mx.

As can be seen, the gate-to-source voltage $V_{gsMref}$ of the NMOS transistor Mref is equal to the gate-to-source voltage $V_{gsMn}$ of each of the NMOS transistors M1, ..., Mn. Therefore, the ratio of the reference current Iref and each of the mirrored stage output currents I1, ..., In is established as the ratio of the gate width to length ratios of the NMOS transistor Mref and the gate width to length ratios each of the NMOS transistors M1, ..., Mn. This is shown by the equation:

$$\frac{In}{Iref} = \frac{\left(\frac{W}{L}\right)_{Mx}}{\left(\frac{W}{L}\right)_{Mref}}$$

Assuming that the NMOS transistor Mref and each of the NMOS transistors M1, ..., Mn have the same geometry, the mirrored stage output currents I1, ..., In are equal to the reference current Iref. As the each of the switches SW1, ..., SWn are activated the output current Iout increases by the magnitude of the mirrored current. Effectively, the gate width of the current mirroring transistor increases with each additional NMOS transistors M1, ..., Mn.

The output voltage compliance (Vout,min) is determined by the equation:

$$V\text{out,min} = V\text{sat1} + V\text{sw1}$$

Where:

Vsat1 is the drain-to-source saturation voltage for current source NMOS transistors M1, ..., Mn.

Vsw1 is the voltage drop across the switches SW1, ..., SWn.

The drain-to-source saturation voltage Vsat1 for current source NMOS transistors M1, ..., Mn is determined by the equation:

$$Vsat1 \sim \sqrt{\left(\frac{2 \times Iout}{\beta \times \frac{Wn}{Ln}}\right)}$$

Where:

$$\beta = \mu C_{ox} \frac{Wn}{Ln}$$

The voltage drop Vsw1 across the switches SW1, ..., SWn is determined by the equation:

$$Vsw1 = \frac{Iout}{\left(\beta \times \frac{Wsw}{Lsw} \times Vov\right)}$$

Where:

Vov is the over-drive voltage of the switches SW1, ..., SWn.

The output voltage compliance is determined by the highest compliance of the current source NMOS transistors M1, ..., Mn. Normally, all stages would be designed with the same voltage compliance, so that the output voltage compliance remains the same for all programmed output current Iout values. However, most of the time the maximum brightness level (and therefore maximum current output) is not used, which means a large proportion of the programmable current source 10 area is not often used, leading to non-optimal use of the silicon area/circuitry.

SUMMARY

An object to this disclosure is to provide a programmable current source having a very low compliance and a wide range of source current.

An LED driving system having high efficiency over a range of brightness levels.

To accomplish at least one of these objects, a programmable current source circuit has a DAC current source structured to provide an incrementally adjustable output current signal to an external circuit such as a grouping of LED's for backlighting an LCD display. A programmable reference current source is connected to the DAC current source to adjust a compliance factor of the DAC current source. A digital selector receives a digital adjustment code from an external control circuit and decodes the adjustment code to select an amplitude for the incrementally adjustable output current signal. An adjustment code modification circuit is connected to the digital selector to receive the decoded adjustment code. The adjustment code modification circuit determines if a magnitude of the incrementally adjustable output current signal is greater or less than an activation compliance level. When the decoded adjustment code indicates that the incrementally adjustable output current signal is to be greater than the activation compliance level, the adjustment code modification circuit transfers a reference current adjustment signal to the programmable reference current source to provide the reference current at a first level or normal level to maintain the compliance factor of the DAC current source. The adjustment code modification circuit provides a magnitude select signal to the programmable current source to set the amplitude of the incrementally adjustable output current signal. When the adjustment code indicates that the incrementally adjustable output current signal is to be less than the activation compliance level, the adjustment code modification circuit transfers the reference current adjustment signal to the programmable reference current source to provide the reference current at a second level to adjust the compliance factor of the DAC current source to a lower level. The adjustment code modification circuit provides a magnitude select signal to the DAC current source to set the amplitude of the incrementally adjustable output current signal.

The DAC current source has a diode connected MOS transistor having its common gate/drain connection connected to receive the reference current from the programmable reference current source. The DAC current source further has a multiple current source NMOS transistors having their gates commonly connected to the gate/drain of the diode connected MOS transistor. The drain of each of the current source NMOS transistors is connected to a first terminal of one of multiple switch devices. A second terminal of each of the switch devices is connected commonly to an output terminal to provide the incrementally adjustable output current. A select terminal of each of the switch devices is connected to receive the decoded adjustment code or the modified adjustment code from the adjustment code modification circuit.

To accomplish at least one of the objects, some embodiments have an LED driving system for sourcing current to multiple serially connected LED's has a programmable current source. The programmable current source has a DAC current source for providing an adjustable current over a wide range of current levels with a low compliance voltage level.

The DAC current source is connected to a programmable reference current source to provide adjust a compliance factor of the programmable current source. The DAC current source is in communication with a selector circuit for determining an intensity level for the multiple serially connected LED's. The selector circuit receives an intensity adjustment code from an external circuit, decodes the intensity adjustment code to transfer the intensity level selected to the multiple serially connected LED's. A code modification circuit is connected between the selector circuit and the DAC current source to receive the intensity adjustment code and decodes the intensity adjustment code to determine an intensity level signal to be transferred to the DAC current source. If the intensity adjustment code is indicates that the intensity is greater than a compliance activation level, intensity adjustment code is not modified and the intensity signal level is transferred to the DAC current source.

The code modification circuit is in communication with the programmable reference current source to transfer a reference current magnitude adjustment signal to the programmable reference current source. When the intensity adjustment code indicates that the intensity is greater than a compliance activation level, the reference current magnitude adjustment signal is transferred to the programmable reference current source to command the programmable reference current source to provide a first reference current level to the DAC current source to provide a larger upper range of currents from the DAC current source. When the intensity adjustment code indicates that the intensity is less than the activation compliance level, the code modification circuit transfers the reference current magnitude adjustment signal to command the programmable reference current source to provide a second reference current level to the DAC current source to provide a lower compliance voltage level from the DAC current source at lower output current level.

In various embodiments, at least one of the objects is accomplished by a method for adjusting a programmable current source to have a very low compliance factor and a wide range of source current. The method begins with providing a programmable current source having a DAC current source connected to a programmable reference current source. An amplitude adjustment code is examined to determine if an output current signal of the DAC current source is to be set to an amplitude greater or less than a compliance activation level. When the amplitude adjustment code is greater than the compliance activation level, the programmable reference current source is set to be a first reference current level that allows the output current level to have a wide range of selectable upper current levels. When the amplitude adjustment code is less than the compliance activation level, the programmable reference current source is set to be a second reference current level that allows the programmable current source to have a low compliance level and modifying a decoded amplitude adjustment code such that the output current signal have a magnitude indicated by the amplitude adjustment code.

BRIEF DESCRIPTION OF THE DRAWINGS

FIG. 1 is a schematic diagram of an LCD display backlighting circuit.

FIG. 2 is a schematic of a DAC current source of the prior art of FIG. 1.

DETAILED DESCRIPTION

In various embodiments, an LCD display controller has a human interface device that allows a person to adjust brightness of the LCD display. For instance, the LCD display may have buttons that are pushed to increase or decrease the desired brightness of the LCD display. The buttons pushed may cause the controller to increment or decrement a counter that indicates the magnitude of the brightness desired by the user. The code from the counter indicates the current level provided by the programmable current source 100 through the serially connected LED's 5 of FIG. 1 to establish the desired brightness level of the serially connected LED's 5.

Figure 3:
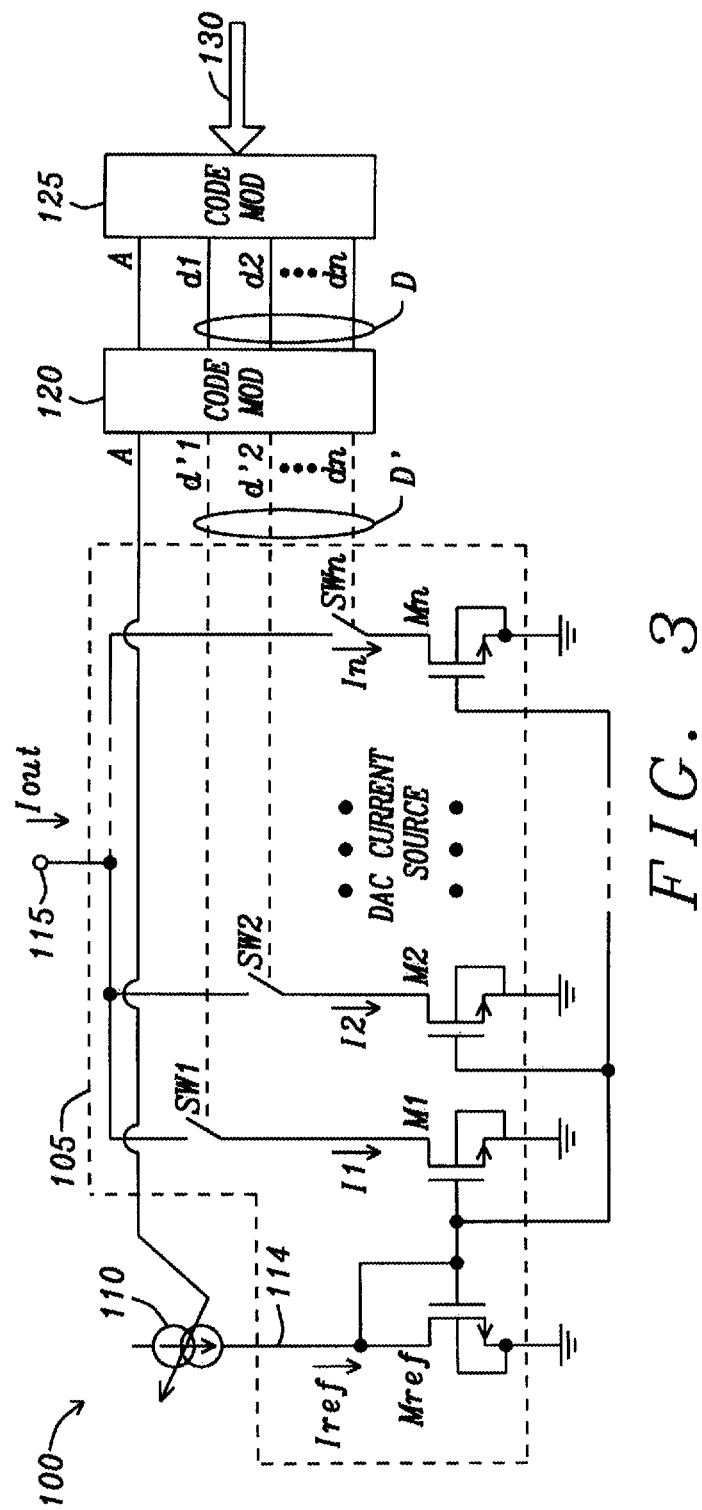
FIG. 3 is a schematic of a DAC current source of the present disclosure.

The programmable current source 100 of the present disclosure as shown in the schematic of FIG. 3 has a DAC current source 105 that receives a reference current Iref from the programmable reference current source 110. The programmable reference current source 110 receives a reference current magnitude adjustment signal A from a code modification circuit 120 to adjust the magnitude of the reference current Iref. As shown in FIG. 2, if the geometries of the NMOS transistor Mref and each of the current source NMOS transistors M1, ..., Mn are the same, the mirrored stage output currents I1, ..., In are equal to the reference current Iref. Therefore, if the reference current were to be reduced by a factor of the reference current magnitude adjustment signal A, the mirrored stage output currents I1, ..., In would also be reduced by the same factor.

Figure 4:
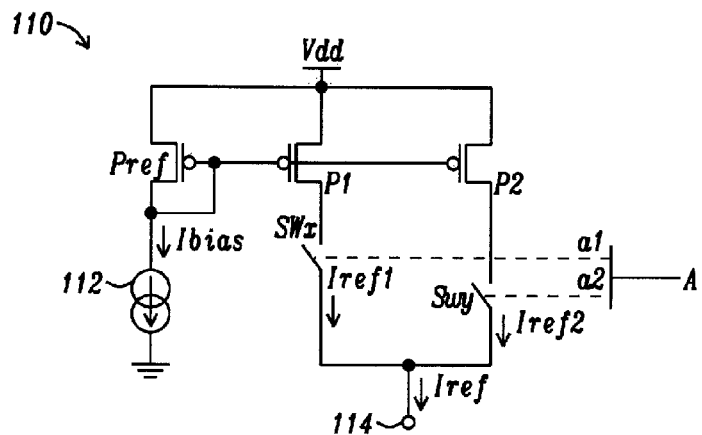
FIG. 4 is a schematic of a programmable reference current source of the present disclosure.

FIG. 4 is a schematic of the programmable reference current source 110 of FIG. 3. The programmable reference current source 110 has a diode connected PMOS transistor Pref with its commonly connected gate and drain connected to a biasing voltage source 112. The biasing current source 112 generates the biasing current Ibias that develops the gate-to-source voltage across the diode connected reference transistor Pref. The gates of the current mirroring PMOS transistors P1 and P2 are connected to the commonly connected drain and gate of the diode connected reference transistor Pref. The sources of the diode connected reference transistor Pref and the current mirroring PMOS transistors P1 and P2 are connected to the power supply voltage source Vdd. The drains of the current mirroring PMOS transistors P1 and P2 are respectively connected to a first terminal of the select switches SWx and SWy. The second terminal of the select switches SWx and SWy are connected to the reference current output terminal 114 to provide the reference current Iref to the DAC current source 105 of FIG. 3.

The control terminals of the select switches SWx and SWy are connected to receive the reference current magnitude adjustment signal A. In various embodiments as shown, the reference current magnitude adjustment signal A has two reference current activation signal lines a1 and a2. When both of the two reference current activation signal lines a1 and a2 have a data state that activates the two select switches SWx and SWy, the two current mirroring PMOS transistors P1 and P2 source the reference currents Iref1 and Iref2. The reference currents Iref1 and Iref2 are summed to form the first level or normal reference current Iref. When one of the two reference current activation signal lines a1 or a2 have a data state that activates one of the two select switches SWx or SWy, the one of the two current mirroring PMOS transistors P1 and P2 associated with the activated select switch SWx or SWy sources either of the reference currents Iref1 or Iref2. The single reference currents Iref1 or Iref2 form the second level or lower level of the reference current Iref.

Referring back to FIG. 3, the DAC current source 105 is structured as described for the DAC current source 30 of FIG. 2, except the switches SW1, ..., SWn now have control terminals connected to the code modification circuit 120. The code modification circuit 120 provides the select signals d'1, ..., d'n that collectively form a modified output current magnitude adjustment signal D'. The code modification circuit 120 receives a decoded output current magnitude signal D from a code generation circuit 125. The code generation circuit 125 receives a digital output current magnitude signal 130 from external circuitry and decodes the digital output current magnitude signal 130 to form the decoded output current magnitude signal D.

The code modification circuit 120 not only generates the modified output current magnitude adjustment signal D' but also generates the reference current magnitude adjustment signal A that is transferred to the programmable current source 110 to adjust the magnitude of the reference current Iref. When the digital output current magnitude signal 130 indicates that the desired output current Iout has a magnitude that is greater than a specified level, the magnitude adjustment signal A is set to a first level or normal level. The programmable reference current source 110 provides the reference current level Iref at the first level such that the output current Iout has a range to accomplish a maximum current level. The output current Iout is determined by the equation:

$$Iout = Iref * D$$

When the digital output current magnitude signal 130 indicates that the desired output current Iout has a magnitude that is less than the specified level, the magnitude adjustment signal A is set to a second level or lower level. The programmable reference current source 110 provides the reference current level Iref at the second level such that the output current Iout has a range to accomplish a minimum current level. The output current Iout is determined by the equation:

$$Iout = \frac{Iref}{A} * D$$

If the reference current Iref is reduced by the magnitude adjustment signal factor A, the output current Iout is also be reduced by the same factor when the decoded output current magnitude signal D remains the same.

In order to maintain the same output current Iout requested, more stages of the DAC current source 105 need to be added to the circuit to compensate for the lower stage output current I1, ..., In. The smaller increment of the stage output current I1, ..., In requires a modification to the decoded output current magnitude signal D driving the switches SW1, ..., SWn. The code modification circuit 120 receives the original decoded output current magnitude signal D and modifies the decoded output current magnitude signal D to create a modified decoded output current magnitude signal D' such that the modified decoded output current magnitude signal D' is determined by the equation:

$$D' => D*A$$

The output current Iout is now determined by the equation:

$$Iout = \frac{Iref}{A} * D'$$

The magnitude adjustment signal factor A in various embodiments is set to a factor of two. This causes the stage output current I1, ..., In to be one-half of the original amount and therefore require twice the number of the switches SW1, ..., SWn to be activated and twice the number of the current source NMOS transistors M1, ..., Mn to be employed to generate the same desired output current Iout. The output compliance voltage is now modified from the above equation to be:

$$Vout,min = Vsat2 + Vsw2$$

$$Vout, min \sim \sqrt{\frac{2 \times Iout}{\beta \times \frac{W2}{L1}} + \frac{Iout}{\beta \times \frac{Wsw2}{Lsw} \times Vov}}$$

Where:
W2 is the combined width of the two current source NMOS transistors M1, ..., Mn.
Wsw2 is the combined width of the two NMOS transistors of the switches SW1, ..., SWn.

Since the combined gate width W2 of two current source NMOS transistors M1, ..., Mn and the combined width Wsw2 of twice the number NMOS transistors of the switches SW1, ..., SWn, the compliance voltage level Vout,min is has a lower magnitude when the reference current Iref is at its second level or reduced by the magnitude adjustment signal factor A than when the reference current Iref is at the first level or normal level.

Figure 5:
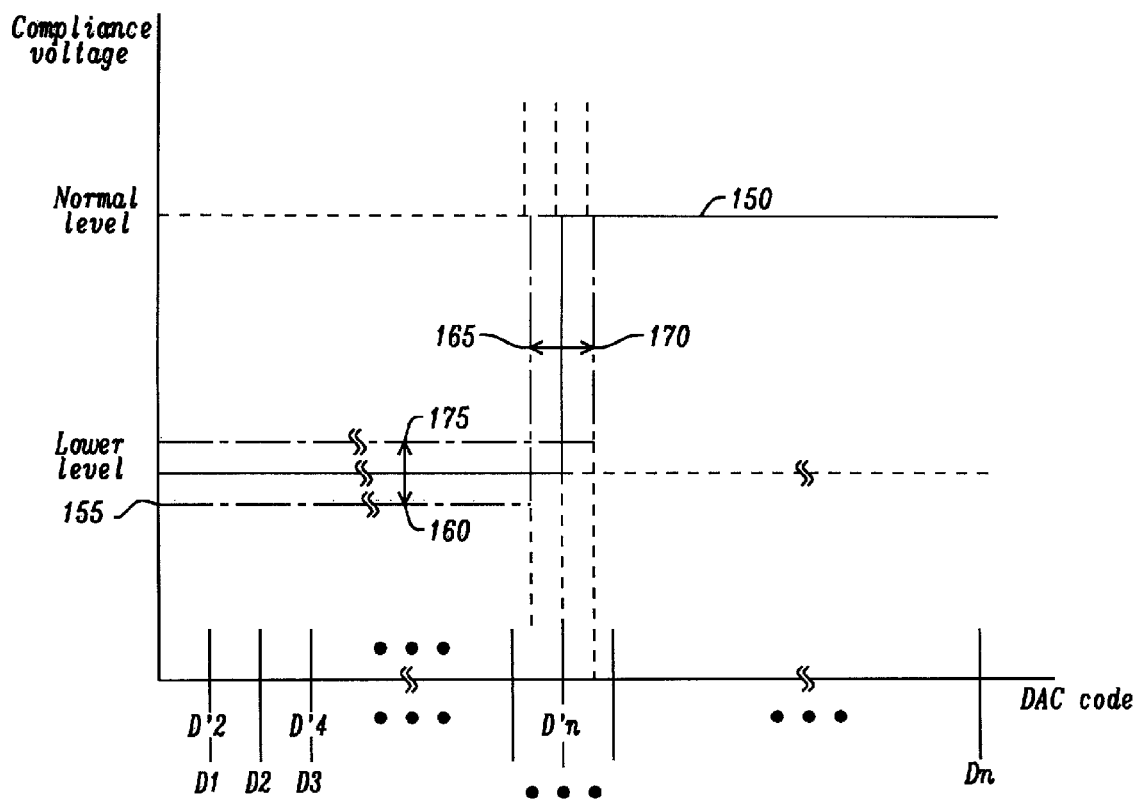
FIG. 5 is a plot of the compliance voltage level verses the amplitude adjustment code of the DAC current source of the present disclosure.

FIG. 5 is a plot of the compliance voltage level verses the amplitude adjustment code D1, ..., Dn, D'2, ..., D'n as applied to the control terminals of the switches SW1, ..., SWn of the DAC current source 105. When the amplitude adjustment code D1, ..., Dn, D'2, ..., D'n is set to operate in the normal compliance region 150, the amplitude adjustment code D1, ..., Dn has a compliance the higher over the full range of operation of the DAC current source 105 and therefore a larger power dissipation. However, when the programmable reference current source 110 is set to a lower reference current level Iref, the DAC current source 105 has a lower compliance voltage region 155. The DAC current source 105 operates in the lower compliance voltage region 155 using paired sets of the current source NMOS transistors M1, ..., Mn from the from the lowest modified amplitude adjustment code D'2 to the highest modified amplitude adjustment code D'n. The DAC current source 105 will have all the current source NMOS transistors M1, ..., Mn activated with modified amplitude adjustment code D'n. The DAC current source 105 then needs to revert back to normal mode where the modified amplitude adjustment code D'2, ..., D'n reverts to the normal amplitude adjustment code D1, ..., Dn. The At this point the compliance voltage level resumes its normal level 150. The programmable reference current source 110 is set to the higher reference current level Iref and the DAC current source 105 operates in the higher compliance voltage region 150.

The level at which the maximum modified amplitude adjustment code D'n is chosen will directly affect the value of the lower level compliance voltage 155. If the maximum modified amplitude adjustment code D'n is chosen to be lower 165, then the lower compliance level decreases 160. If the maximum modified amplitude adjustment code D'n is chosen to be higher 170, then the compliance voltage level increases 175. Consequently, there is a trade-off between the value of the lower compliance voltage level 150 and the maximum value modified amplitude adjustment code D'n. The lower compliance voltage level 160 provides more power efficiency, but a lower range of selectivity for the output current Iout. Alternately the higher compliance voltage level 175 provides less power efficiency, but a wider range of selectivity for the output current Iout.

Figure 6:
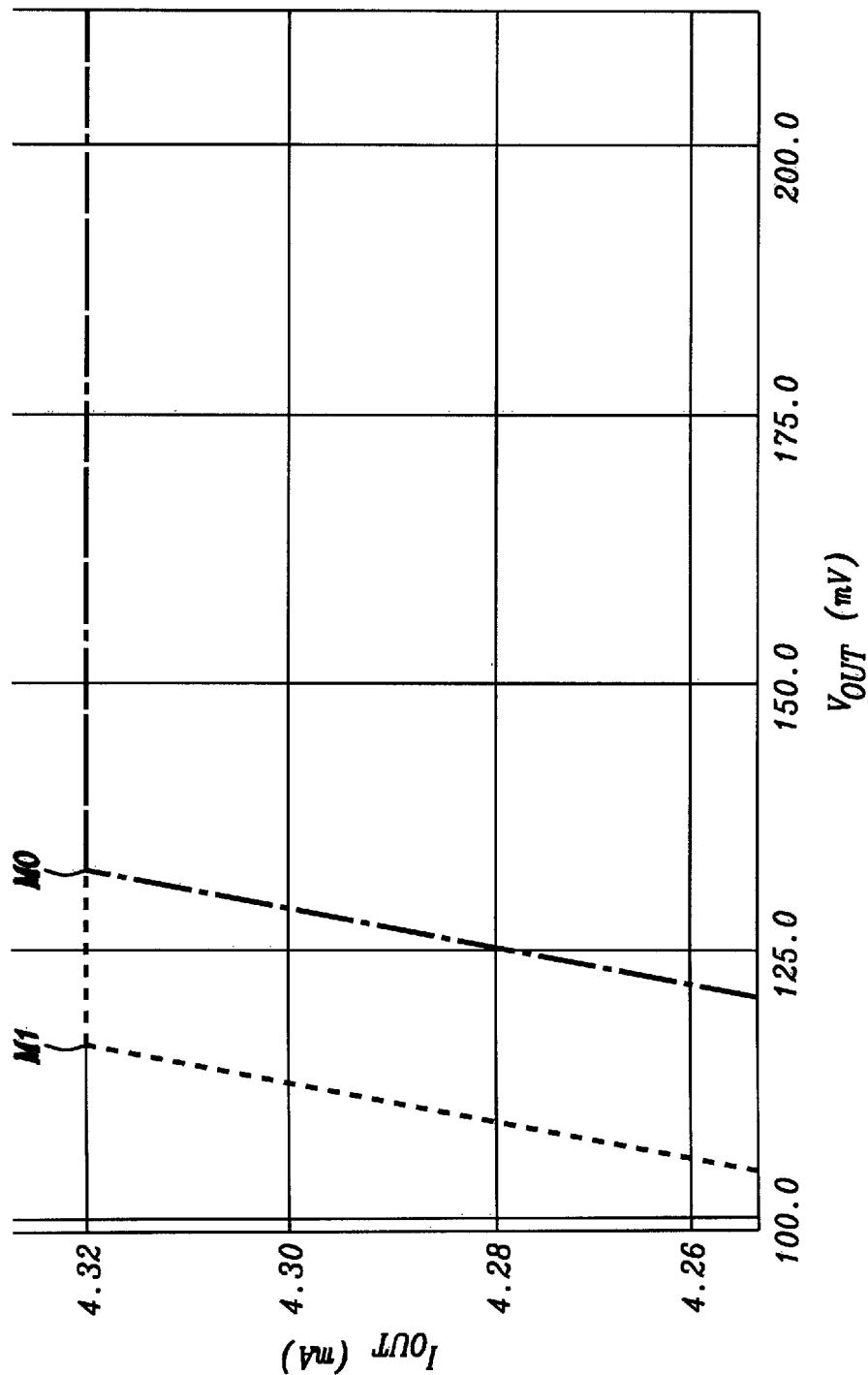
FIG. 6 is a plot of the output current versus the output voltage level of the DAC current source in the normal mode as compared with the low compliance mode of the present disclosure.

FIG. 6 is a plot of the output current Iout versus the output voltage level Vout of the DAC current source 105 in the normal mode as compared with the low compliance mode. The advantage of the programmable current source 100 of FIG. 3 is that the compliance voltage of a given area and size of DAC current source 105 can be reduced in a restricted operating region to enhance the efficiency of a white LED driver, and extend battery life in backlighting circuit using the programmable current source 100. This region may be chosen to be the most commonly used operating region. In the plot of FIG. 6, the output current Iout of the programmable current source 100 is designed to be approximately 4.3 ma. In normal operation, the reference current level Iref is set such that the compliance voltage level M0 is approximately 1,315 mV. In the low compliance mode, the reference current level Iref is set such that the compliance voltage level M1 is approximately 1,165 mV. As can be observed, the power dissipated decreases by 11.4% for this particular implementation.

Figure 7:
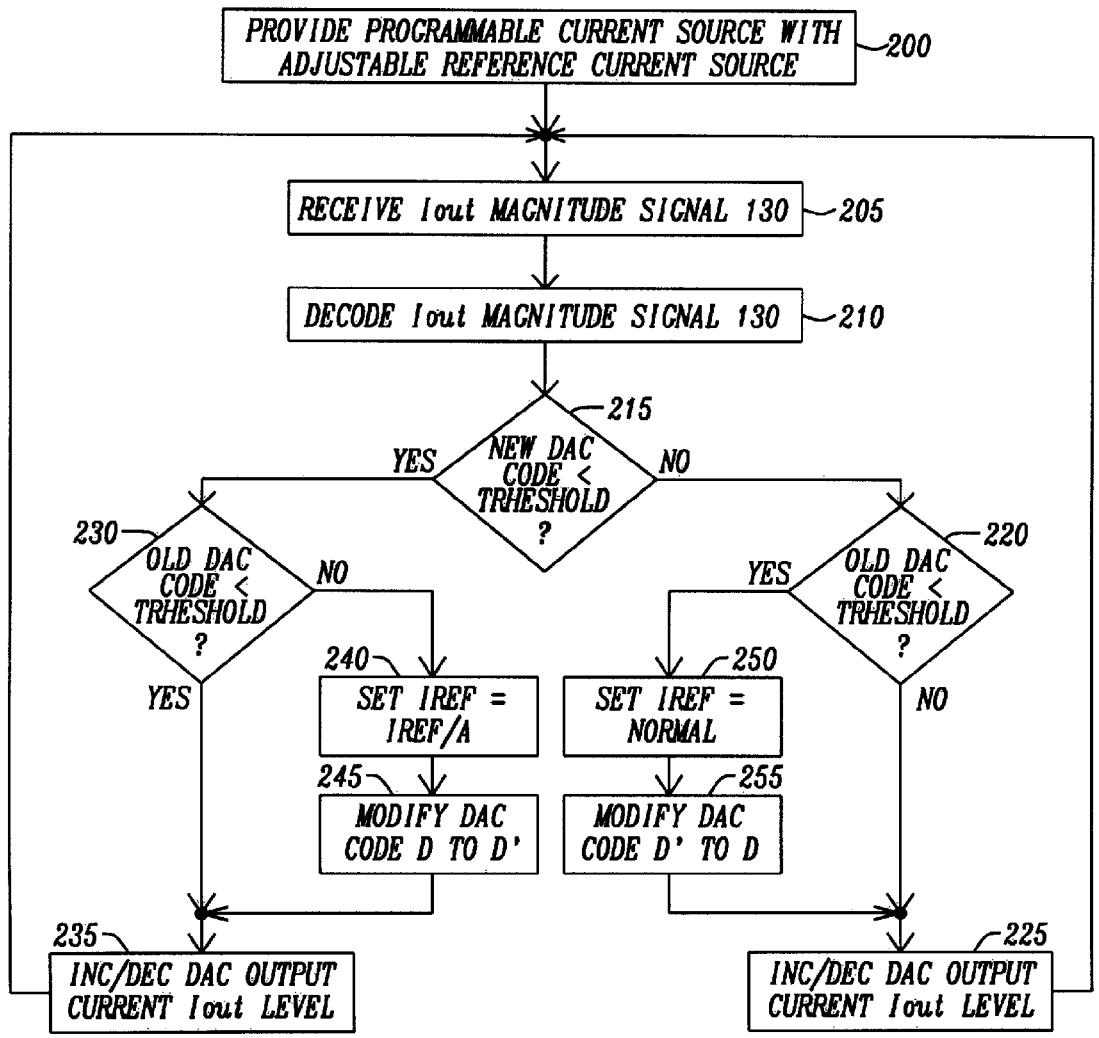
FIG. 7 is a flowchart for a method for adjusting a programmable current source to have a low compliance voltage level and a wide range of incremental current levels of the present disclosure.

FIG. 7 is a flowchart for a method for adjusting a programmable current source to have a low compliance voltage level and a wide range of incremental current levels. Refer to FIGS. 3 and 7 for the description of the method for adjusting a programmable current source 100. The programmable current source is provided (Box 200) as described in FIG. 3. The digital output current magnitude signal 130 is received (Box 205) and decoded (Box 210) to form the decoded output current magnitude signal D. The decoded output current magnitude signal D is then compared (Box 215) to a threshold that is equivalent to the highest modified amplitude adjustment code D'n of FIG. 5. When the decoded output current magnitude signal D is greater than the threshold, a previous version of the decoded output current magnitude signal D is then compared (Box 220) to the threshold voltage level. When the current version and the previous version of the decoded output current magnitude signal D is greater than the threshold voltage level, the decoded output current magnitude signal D is transferred to the switches SW1, . . . , SWn of the DAC current source 105 to increase or decrease (Box 225) the output current level Iout of the DAC current source 105. When the decoded output current magnitude signal D is less than the threshold, a previous version of the decoded output current magnitude signal D is then compared (Box 230) to the threshold voltage level. When the current version and the previous version of the decoded output current magnitude signal D is less than the threshold voltage level, the modified decoded output current magnitude signal D' is transferred to the switches SW1, . . . , SWn of the DAC current source 105 to increase or decrease (Box 235) the output current level Iout of the DAC current source 105. The programmable reference current source is programmed such that the reference current Iref is decreased by the second level of the magnitude adjustment signal factor A such that the output current Iout is determined by the equation.

$$Iout = \frac{Iref}{A} * D'$$

When the decoded output current magnitude signal D is greater than the threshold and the previous version of the decoded output current magnitude signal D is less than the threshold voltage level, the magnitude adjustment signal factor A is adjusted to the first level such that the reference current Iref is set to the first level or normal level (Box 250). The modified output current magnitude signal D' is restored Box 255) to the normal decoded output current magnitude signal D and the decoded output current magnitude signal D is transferred to the switches SW1, . . . , SWn of the DAC current source 105 to increase or decrease (Box 225) the output current level Iout of the DAC current source 105.

When the decoded output current magnitude signal D is less than the threshold and the previous version of the decoded output current magnitude signal D is less than the threshold voltage level, the magnitude adjustment signal factor A is adjusted to the second level such that the reference current Iref is set (Box 250) to the second level or Iref=Iref/A. The decoded output current magnitude signal D is modified Box 245) from normal decoded output current magnitude signal D to the modified output current magnitude signal D'. The modified output current magnitude signal D' is transferred to the switches SW1, . . . , SWn of the DAC current source 105 to increase or decrease (Box 235) the output current level Iout of the DAC current source 105.

At the completion of the increase or decrease (Box 225 or 235) the output current level Iout of the DAC current source 105, the process returns to await receiving (Box 205) the next digital output current magnitude signal 130.

While this disclosure has been particularly shown and described with reference to the preferred embodiments thereof, it will be understood by those skilled in the art that various changes in form and details may be made without departing from the spirit and scope of the disclosure. For instance the DAC current source 105 may be implemented with PMOS transistors and the programmable reference current source may be implemented as NMOS transistors. Similarly, it will be apparent to those skilled in the art the programmable current source 100 of FIG. 3 can be implemented with bipolar junction transistors. Still further it is in keeping with the intent of this disclosure that other circuit architectures are suitable for the DAC current source 105.

What claimed is:

1. A programmable current source circuit comprising:
 a digital-to-analog (DAC) current source structured to provide an incrementally adjustable output current signal to an external circuit;
 a programmable reference current source connected to the DAC current source to adjust a compliance factor of the DAC current source;
 a digital selector in communication with a control circuit to receive a digital adjustment code from the external control circuit and decode the digital adjustment code to form a decoded output current magnitude signal to select an amplitude for the incrementally adjustable output current signal; and
 an adjustment code modification circuit is connected to the digital selector to receive the decoded output current magnitude signal to determine if a magnitude of the incrementally adjustable output current signal is greater or less than an activation compliance level for adjusting a reference current of the programmable reference current source to adjust the compliance factor of the DAC current source and to modify the decoded output current magnitude signal for a desired incrementally adjustable output current signal.

2. The programmable current source circuit of claim 1 wherein when the decoded adjustment code indicates that the incrementally adjustable output current signal is to be greater than the activation compliance level, the adjustment code modification circuit transfers a reference current adjustment signal to the programmable reference current source to provide the reference current at a first level to maintain a normal compliance factor of the DAC current source and the adjustment code modification circuit provides a magnitude select signal to the programmable current source to set the amplitude of the incrementally adjustable output current signal.

3. The programmable current source circuit of claim 2 wherein when the adjustment code indicates that the incrementally adjustable output current signal is to be less than the activation compliance level, the adjustment code modification circuit transfers the reference current adjustment signal to the programmable reference current source to provide the reference current at a second level to adjust the compliance factor of the DAC current source to a lower level and the adjustment code modification circuit provides the magnitude select signal to the DAC current source to set the amplitude of the incrementally adjustable output current signal.

4. The programmable current source circuit of claim 1 wherein the external circuitry is a grouping of LED's for backlighting an LCD display.

5. The programmable current source circuit of claim 1 wherein the DAC current source comprises:
   a diode connected transistor having its common gate/drain connection connected to receive the reference current from the programmable reference current source;
   a plurality of current source transistors having their gates commonly connected to the gate/drain of the diode connected MOS transistor;
   a plurality of switch devices wherein each switch device comprises:
      a first terminal connected to a drain of one of the current source NMOS transistors;
      second terminal connected commonly to an output terminal of the DAC current source to provide the incrementally adjustable output current; and
      a select terminal connected to receive the decoded adjustment code or the decoded output current magnitude signal or the modified decoded output current magnitude signal from the adjustment code modification circuit.

6. An electronic apparatus comprising:
   at least one electronic device requiring a current with programmable current levels; and
   a programmable current source circuit for providing the programmable current levels to the at least one electronic device comprising:
      a digital-to-analog (DAC) current source structured to provide an incrementally programmable current levels to at least one electronic device,
      a programmable reference current source connected to the DAC current source to adjust a compliance factor of the DAC current source,
      a digital selector in communication with a control circuit to receive a digital adjustment code from the external control circuit and decode the digital adjustment code for form a decoded output current magnitude signal to select an amplitude for the incrementally programmable current levels, and
      an adjustment code modification circuit is connected to the digital selector to receive the decoded output current magnitude signal to determine if a magnitude of the incrementally programmable current levels is greater or less than an activation compliance level for adjusting a reference current of the programmable reference current source to adjust the compliance factor of the DAC current source and to modify the decoded output current magnitude signal for a desired incrementally programmable current levels.

7. The electronic apparatus of claim 6 wherein when the decoded adjustment code indicates that the incrementally programmable current levels is to be greater than the activation compliance level, the adjustment code modification circuit transfers a reference current adjustment signal to the programmable reference current source to provide the reference current at a first level to maintain a normal compliance factor of the DAC current source and the adjustment code modification circuit provides a magnitude select signal to the programmable current source to set the amplitude of the incrementally programmable current levels.

8. The electronic apparatus of claim 7 wherein when the adjustment code indicates that the incrementally programmable current levels is to be less than the activation compliance level, the adjustment code modification circuit transfers the reference current adjustment signal to the programmable reference current source to provide the reference current at a second level to adjust the compliance factor of the DAC current source to a lower level and the adjustment code modification circuit provides the magnitude select signal to the DAC current source to set the amplitude of the incrementally programmable current levels.

9. The electronic apparatus of claim 6 wherein the electronic apparatus is an LCD display and the external circuitry is a grouping of LED's for backlighting the LCD display.

10. The electronic apparatus of claim 6 wherein the DAC current source comprises:
    a diode connected transistor having its common gate/drain connection connected to receive the reference current from the programmable reference current source;
    a plurality of current source transistors having their gates commonly connected to the gate/drain of the diode connected MOS transistor;
    a plurality of switch devices wherein each switch device comprises:
       a first terminal connected to a drain of one of the current source NMOS transistors;
       second terminal connected commonly to an output terminal of the DAC current source to provide the incrementally adjustable output current; and
       a select terminal connected to receive the decoded adjustment code or the decoded output current magnitude signal or the modified decoded output current magnitude signal from the adjustment code modification circuit.

11. A Liquid crystal display (LCD) display comprising:
    plurality of serially connected LED's for backlighting the LCD display requiring a current with programmable current levels to adjust brightness of the LED's; and
    a programmable current source circuit connected to the plurality of serially connected LED's to provide the programmable current levels comprising:
       a digital-to-analog (DAC) current source structured to provide incrementally programmable current levels to the plurality of serially connected LED's, a programmable reference current source connected to the DAC current source to adjust a compliance factor of the DAC current source, a digital selector in communication with a control circuit to receive a digital adjustment code from the external control circuit and decode the digital adjustment code for form a decoded output current magnitude signal to select an amplitude for the incrementally programmable current levels, and an adjustment code modification circuit is connected to the digital selector to receive the decoded output current magnitude signal to determine if a magnitude of the incrementally programmable current levels is greater or less than an activation compliance level for adjusting a reference current of the programmable reference current source to adjust the compliance factor of the DAC current source and to modify the decoded output current magnitude signal for a desired incrementally programmable current levels.

12. The electronic apparatus of claim 11 wherein when the decoded adjustment code indicates that the incrementally programmable current levels is to be greater than the activation compliance level, the adjustment code modification circuit transfers a reference current adjustment signal to the programmable reference current source to provide the reference current at a first level to maintain a normal compliance factor of the DAC current source and the adjustment code modification circuit provides a magnitude select signal to the programmable current source to set the amplitude of the incrementally programmable current levels.

13. The electronic apparatus of claim 12 wherein when the adjustment code indicates that the incrementally programmable current levels is to be less than the activation compliance level, the adjustment code modification circuit transfers the reference current adjustment signal to the programmable reference current source to provide the reference current at a second level to adjust the compliance factor of the DAC current source to a lower level and the adjustment code modification circuit provides the magnitude select signal to the DAC current source to set the amplitude of the incrementally programmable current levels.

14. The electronic apparatus of claim 11 wherein the DAC current source comprises:
a diode connected transistor having its common gate/drain connection connected to receive the reference current from the programmable reference current source;
a plurality of current source transistors having their gates commonly connected to the gate/drain of the diode connected MOS transistor;
a plurality of switch devices wherein each switch device comprises:
a first terminal connected to a drain of one of the current source NMOS transistors;
second terminal connected commonly to an output terminal of the DAC current source to provide the incrementally adjustable output current; and
a select terminal connected to receive the decoded adjustment code or the decoded output current magnitude signal or the modified decoded output current magnitude signal from the adjustment code modification circuit.

15. A method for adjusting a programmable current source to have a very low compliance factor and a wide range of source current, comprising the steps of:
providing a programmable current source having a DAC current source connected to a programmable reference current source;
examining amplitude current adjustment code to determine if an output current signal of the DAC current source is to be set to an amplitude greater or less than a compliance activation level;
setting the programmable reference current source to be a first reference current level that allows the output current level to have a wide range of selectable upper current levels and applying a decoded amplitude adjustment code to the DAC current source, when the amplitude adjustment code is greater than the compliance activation level; and
setting the programmable reference current source to be a second reference current level that allows the programmable current source to have a low compliance level and modifying a decoded amplitude adjustment code such that the output current signal have a magnitude indicated by the amplitude adjustment code, when the amplitude adjustment code is less than the compliance activation level.

16. An apparatus for adjusting a programmable current source to have a very low compliance factor and a wide range of source current, comprising the steps of:
means for providing a programmable current source having a DAC current source connected to the programmable reference current source;
means for examining amplitude current adjustment code to determine if an output current signal of the DAC current source is to be set to an amplitude greater or less than a compliance activation level;
means for setting the programmable reference current source to be a first reference current level that allows the output current level to have a wide range of selectable upper current levels and applying a decoded amplitude adjustment code to the DAC current source, when the amplitude adjustment code is greater than the compliance activation level; and
means for setting the programmable reference current source to be a second reference current level that allows the programmable current source to have a low compliance level and modifying a decoded amplitude adjustment code such that the output current signal have a magnitude indicated by the amplitude adjustment code, when the amplitude adjustment code is less than the compliance activation level.

* * * * *